May 3, 1927. 1,626,953
F. MÜLLER
TOOL POST
Original Filed Dec. 14, 1921
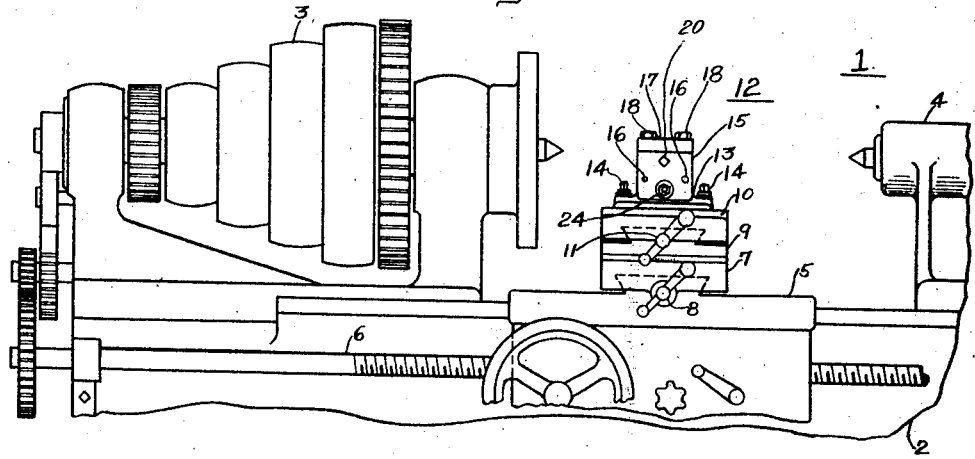
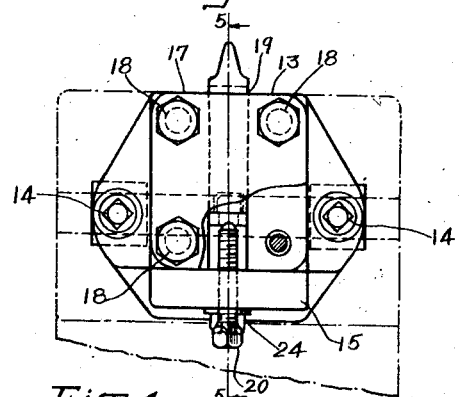
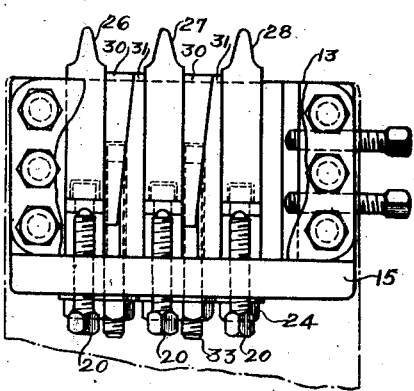
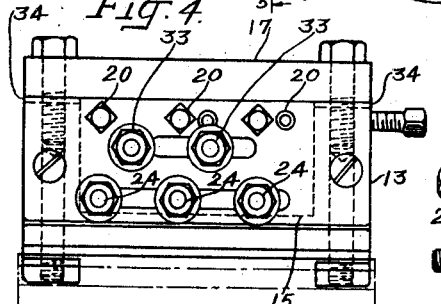
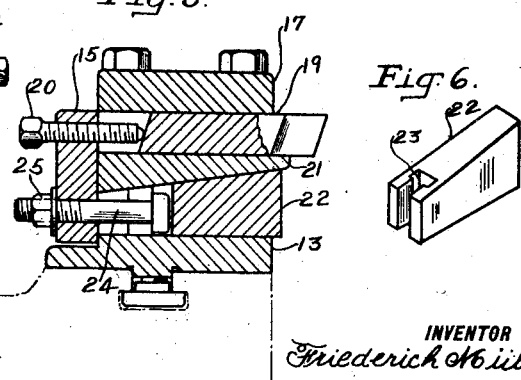
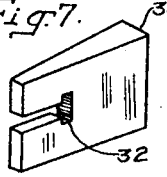
INVENTOR
Friederich Müller
BY Wayne B Wells
ATTORNEY Patented May 3, 1927.

1,626,953

UNITED STATES PATENT OFFICE.

FRIEDERICH MÜLLER, OF ELIZABETH, NEW JERSEY, ASSIGNOR TO PRATT & WHITNEY COMPANY, OF NEW YORK, N. Y., A CORPORATION OF NEW JERSEY.

TOOL POST.

Original application filed December 14, 1921, Serial No. 522,304. Divided and this application filed December 7, 1923. Serial No. 679,218.

My invention relates to tool posts and particularly to tool posts for relieving lathes.

One object of my invention is to provide a tool post that shall have means for so setting the cutting tool that it may be removed from the tool post, ground, and remounted in the tool post in correct relation to the work without changing the setting.

Another object of my invention is to provide a tool post of the above indicated character that shall have a plurality of cutting tools provided with improved means for conveniently adjusting the tools with respect to the work and with respect to each other.

A further object of my invention is to provide a tool post that shall be provided with a cutting tool having the rear end formed at the same angle as the angle of relief at the front end, convenient means for engaging the rear end of the tool to adjust the longitudinal position, and adjustable wedging means for firmly holding the top of the tool in engagement with a top plate.

My invention is particularly adapted for use in a relieving machine of the type disclosed in my companion application Serial No. 522,304, filed December 14, 1921, which is now Patent No. 1,540,898 dated June 9, 1925, and of which the present application is a division.

In a tool post constructed in accordance with my invention, the rear end of the cutting tool is formed with an angle similar to the relief angle on the front end of the tool and a bolt secured to the front plate of the tool post engages the rear end of the tool to adjust the longitudinal position thereof. The cutting tool is held in engagement with the top plate on the tool post by suitable wedging means. Such top plate may be adjusted by means of shims to hold the cutting tool in correct relation to the center line of the relieving machine or lathe. Suitable wedging means is provided for adjusting the cutting tools with respect to each other in case the tool post is provided with more than one cutting tool.

In a tool post so constructed, it is possible, after setting the tool in correct longitudinal position, to remove the cutting tool, grind the top face, and remount the tool in the post without again going to the trouble of resetting it.

In the accompanying drawing:

Figure 1 is an elevational view of a tool post constructed in accordance with my invention and mounted on a lathe.

Fig. 2 is a plan view of the tool post shown in Fig. 1.

Fig. 3 is a plan view of a tool post provided with a number of cutting tools.

Fig. 4 is an elevational view of the tool post shown in Fig. 3.

Fig. 5 is a sectional view along the line 5—5 of Fig. 3.

Figs. 6 and 7 are detail views of the wedges shown in Figs. 3 and 4.

Referring to the drawing and particularly to Figs. 1, 2 and 5, a lathe 1 is shown comprising a bed 2 upon which is mounted a headstock 3 and a tailstock 4. A carriage 5, which is mounted on the bed 2, is operated by a feed screw 6. The carriage 5 supports a transverse slide 7 which is operated by a screw shaft 8. The slide 7 carries a plate 9 which is rotatably adjusted in any suitable manner upon the slide 7. The plate 9 carries a tool slide 10 which is operated by a screw shaft 11. The slide 10 carries a suitable tool post 12.

The tool post 12 comprises a suitable frame 13 which is secured to the slide 10 by means of bolts 14. A front plate 15 is secured to the frame 13 by means of bolts 16. A top plate 17 is secured to the frame by means of bolts 18.

A cutting tool 19, shown in Figs. 2 and 5 of the drawing, has the rear end thereof formed at the same angle as the relief angle at the front end. By having the rear end of the tool formed at the same angle as the front end, as shown in Fig. 5 of the drawing, it is possible to sharpen the tool by grinding the top face and remount it in the tool post without in any way interfering with the setting which had been made before grinding. A suitable bolt 20, which is secured to the front plate 15, is provided for engaging the rear end of the tool to adjust the longitudinal position of such tool. Two wedge members 21 and 22 are provided for holding the tool 19 firmly in engagement with the top plate 17. One end of the wedge member 22 is provided with a T-slot 23 in which is fitted a T-bolt 24. The T-bolt 24 extends through the front plate 15, as shown in Fig 5 of the drawing, and is operated by means of a nut 25.

In Figs. 3 and 4 is shown a tool post which carries a number of cutting tools 26, 27 and 28. The tools 26, 27 and 28 are similar in construction to the cutting tool 19 shown in Figs. 2 and 5 of the drawing. Moreover, the tools 26, 27 and 28 are longitudinally adjusted by means of bolts 20 in the same manner as the tool 19. Wedge members 21 and 22, which are operated by bolts 24, are provided for holding the tools 26, 27 and 28 firmly in position as in the manner above set forth in describing Figs. 2 and 5 of the drawing.

Between the cutting tools 26 and 27 and the cutting tools 27 and 28 are provided wedge members 30 and 31. The wedge members 30 and 31 serve to adjust the relative positions of the cutting tools. A suitable T-slot 32 is formed in the wedge member 30 as indicated in Fig. 7 of the drawing. The T-slot 32 is engaged by a T-bolt 33 which extends through the front plate 15.

The height of the top plate 17 may be adjusted by means of shims 34 which are placed between the top plate and the frame 13. Such shims are not only used when a plurality of tools are provided in the tool post but also are used to adjust the height of the tool when a single tool is used in the post. It will be noted that the bottom surface of the top plate 17 determines the height of the cutting point of the tool.

Modifications in the tool post, and in the arrangement and location of parts may be made within the spirit and scope of my invention and such modifications are intended to be covered by the appended claims.

What I claim is:

1. In a tool post, the combination with a frame, a top plate secured to the frame, and a cutting tool mounted in said frame, said cutting tool having the rear end formed at the same angle as the relief angle at the front end, of means for adjusting the longitudinal position of the cutting tool, and means for holding the tool in engagement with the top plate.

2. In a tool post, the combinaton with a frame, a top plate adjustably secured to the frame so as to be set at different heights, and a cutting tool having the rear end formed at the same angle as the relief angle at the front end, of means for adjusting the longitudinal position of the cutting tool, and means for holding the cutting tool in engagement with said top plate.

3. In a tool post, the combination with a frame having a base and two side portions, a top plate adjustably secured to said sides, and a front plate secured to the frame, of a cutting tool, a surface at the rear of the tool formed at the same angle as the relief angle at the front end of the tool, adjustable means for engaging said surface to vary the longitudinal position of the tool, and wedge members for holding the tool against the top plate.

4. In a tool post, the combination with a frame having a base and two side portions, a top plate adjustably secured to said sides, and a front plate secured to the frame, of a cutting tool having the rear end formed at the same angle as the relief angle at the front end, a bolt secured to the front plate for engaging the rear end of the tool to vary the longitudinal position thereof, wedge members for supporting the cutting tool, and means secured to the front plate for operating one of said wedge members to hold the cutting tool in engagement with the top plate.

5. In a tool post, the combination with a frame, and a cutting tool mounted in said frame, said cutting tool having the rear end formed at the same angle as the relief angle at the front end, of means for permitting the removal of the tool for grinding the top face and the remounting of the tool in position without the adjusting of its longitudinal position with respect to the work.

6. In a tool post, the combination with a frame, and a cutting tool mounted in said frame, a surface at the rear of the tool formed at the same angle as the relief angle at the front end of the tool, of means for engaging said surface so that the tool may be removed, ground on the top face thereof and returned to position without adjusting its longitudinal position.

7. In a tool post, the combination with a frame, and a cutting tool mounted in said frame, said cutting tool having the rear end formed at the same angle as the relief angle at the front end, of means for adjusting the vertical position of the tool, and means for adjusting the longitudinal position of the tool so that it may be ground on the top face and returned into position without adjusting the longitudinal position thereof.

8. In a tool post, the combination with a frame, a top plate adjustably secured to said frame so as to be set at different heights, and a plurality of cutting tools mounted in said frame, each of said cutting tools having the rear end formed at the same angle as the relief angle at the front end, of means for engaging the rear ends of said tools to adjust their longitudinal positions, and wedge members for holding the tools in engagement with the top plate and for relatively adjusting the tools.

In testimony whereof, I hereto affix my signature.

FRIEDERICH MÜLLER.